(12) United States Patent
Yamauchi et al.

(10) Patent No.: US 9,315,103 B2
(45) Date of Patent: Apr. 19, 2016

(54) MULTIFUNCTION OPERATION TOOL AND ARMREST OPERATION DEVICE

(71) Applicant: KUBOTA CORPORATION, Osaka (JP)

(72) Inventors: Teruhito Yamauchi, Osaka (JP); Motonari Inaoka, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 14/664,004

(22) Filed: Mar. 20, 2015

(65) Prior Publication Data

US 2016/0009174 A1  Jan. 14, 2016

(30) Foreign Application Priority Data

Jul. 8, 2014  (JP) ................................. 2014-140589

(51) Int. Cl.
*G05G 1/06* (2006.01)
*B60K 20/02* (2006.01)
(Continued)

(52) U.S. Cl.
CPC ................ *B60K 26/02* (2013.01); *A01B 71/02* (2013.01); *B60K 20/08* (2013.01); *B60K 26/00* (2013.01); *B60K 26/04* (2013.01); *F16H 59/0278* (2013.01); *G05G 1/06* (2013.01); *G05G 1/58* (2013.01); *G05G 1/62* (2013.01); *G05G 9/04785* (2013.01); *G05G 9/04788* (2013.01); *B60K 20/02* (2013.01); *B60K 2026/029* (2013.01); *B60Y 2200/221* (2013.01); *B60Y 2200/415* (2013.01); *E02F 9/2004* (2013.01); *F16H2059/0282* (2013.01); *G05G 2009/04774* (2013.01)

(58) Field of Classification Search
CPC .. B60K 2026/029; B60K 20/00; B60K 20/02; B60K 26/00; B60K 26/02; G05G 9/047; G05G 9/04785; G05G 9/04788; G05G 2009/04774; G05G 1/04; G05G 1/06; G05G 1/58; G05G 1/62; H01H 2009/066; F16H 59/0278; F16H 2059/0282; E02F 9/2004
USPC ......................................... 180/333; D14/415
See application file for complete search history.

(56) References Cited

U.S. PATENT DOCUMENTS

| | | |
|---|---|---|
| 5,924,515 A | 7/1999 | Stauffer |
| 5,938,282 A | 8/1999 | Epple |

(Continued)

FOREIGN PATENT DOCUMENTS

| | | |
|---|---|---|
| DE | 102006018537 A1 | 11/2007 |
| EP | 0712062 A2 | 5/1996 |

(Continued)

*Primary Examiner* — Keith Frisby
(74) *Attorney, Agent, or Firm* — Greenblum & Bernstein, P.L.C.

(57) ABSTRACT

A multifunction operation tool includes a swing body swingably supported in a front/back direction of a vehicle body and implementing acceleration control on a transmission by swinging in a forward direction and implementing deceleration control on the transmission by swinging in a rearward direction. A grip body arranged on a free end portion of the swing body. A grip part arranged on a first lateral area of the grip body in a transverse direction of the vehicle body and having a convex surface. A vertical lateral surface arranged on a second lateral area of the grip body and which is a lateral surface of the grip part. An operator-facing surface arranged on the second lateral area of the grip body and extending in the transverse direction of the vehicle body from a bottom edge of the vertical lateral surface. Operation switch groups are arranged on the vertical lateral surface and the operator-facing surface.

17 Claims, 8 Drawing Sheets

(51) Int. Cl.
*B60K 26/02* (2006.01)
*A01B 71/02* (2006.01)
*F16H 59/02* (2006.01)
*B60K 20/08* (2006.01)
*B60K 26/00* (2006.01)
*B60K 26/04* (2006.01)
*G05G 1/58* (2008.04)
*G05G 1/62* (2008.04)
*G05G 9/047* (2006.01)
*E02F 9/20* (2006.01)

(56) References Cited

U.S. PATENT DOCUMENTS

| | | | |
|---|---|---|---|
| 5,978,720 A | 11/1999 | Hileronymus et al. | |
| 6,148,593 A | 11/2000 | Heinsey et al. | |
| 6,932,183 B2 | 8/2005 | Jeppe et al. | |
| 8,770,887 B1 * | 7/2014 | Geier | E01C 19/286 200/61.54 |
| 2005/0133292 A1 | 6/2005 | Ginzel et al. | |
| 2007/0210901 A1 | 9/2007 | Ahrens et al. | |
| 2009/0139360 A1 * | 6/2009 | Diccion | E02F 9/2004 74/471 XY |
| 2012/0253594 A1 | 10/2012 | Schreiber | |

FOREIGN PATENT DOCUMENTS

| | | |
|---|---|---|
| EP | 0965901 A2 | 12/1999 |
| EP | 0965901 | 10/2007 |
| EP | 2277369 A1 | 1/2011 |
| EP | 2277736 | 1/2011 |
| WO | WO2012/113991 | 8/2012 |

* cited by examiner

MULTIFUNCTION OPERATION TOOL AND ARMREST OPERATION DEVICE

CROSS-REFERENCE TO RELATED APPLICATIONS

The present application claims priority under 35 U.S.C. §119 of Japanese Application No. 2014-140589, filed on Jul. 8, 2014, the disclosure of which is expressly incorporated by reference herein in its entirety.

BACKGROUND OF THE INVENTION

1. Field of the Invention

The present invention relates to a multifunction operation tool controlling a work apparatus and a transmission that changes a traveling speed, which are provided to a work vehicle, and also relates to an armrest operation device provided with the multifunction operation tool.

2. Description of Related Art

An armrest operation device controlling a work vehicle is disclosed in U.S. Patent Application Publication No. US 2005/0133292 A1. In this armrest operation device, a transmission control lever protruding upward is arranged forward of an arm resting on an armrest, and a traveling speed of the vehicle can be adjusted by gripping the transmission control lever with the fingers of the arm resting on the armrest and performing a swinging operation. Further, a button to upshift the transmission, a button to downshift the transmission, and a button (switch) to shift the transmission into a park position are arranged on a lateral surface of the transmission control lever. Thus, an operator can operate the above-noted button group with the thumb of the hand gripping the transmission control lever. However, the transmission control lever has a shape of an upright cylinder, and because three buttons are aligned vertically on the lateral surface thereof, the operator is made to grip the transmission control lever from a side. Selecting and operating specific buttons in such a state imposes a burden on the operator's hand when continued.

An armrest operation device similar to that disclosed in U.S. Patent Application Publication No. US 2005/0133292 A1 is disclosed in European Patent Application Publication No. EP 2 277 736 A1. In this armrest operation device, a grip operator having a shape of a mouse (such as used as an input device for computers and the like) is arranged forward of the arm resting on the armrest. A surface of the grip operator is formed by combining a plurality of convex surfaces, and an outer surface of the grip operator includes a top surface forming a rest surface to rest a palm and an operation-related lateral surface on which a plurality of button groups are arranged. By performing button operations with the thumb of the hand resting on the rest surface, the transmission can be upshifted/downshifted and the work apparatus can be lifted/lowered. However, in the grip operator, the rest surface and the operation-related lateral surface form one convex surface. Thus, when the palm rests on the rest surface, the thumb naturally comes into contact with the operation-related lateral surface. For this reason, an operator who rests a hand on the rest surface must take care not to press any unnecessary buttons. This imposes a burden on the operator and reduces an advantage of relaxing the hand by resting the hand on the rest surface.

SUMMARY OF THE INVENTION

In view of the above circumstances, a multifunction operation tool providing a comfortable and burden-free operation experience and an armrest operation device provided with the multifunction operation tool are desired.

A multifunction operation tool according to the present invention is a multifunction operation tool controlling a work vehicle provided with a transmission that changes a traveling speed and a work apparatus. The multifunction operation tool includes a swing body, a grip body, a grip part, a vertical lateral surface, an operator-facing surface, and operation switch groups. The swing body is swingably supported in a front/back direction of a vehicle body and implements acceleration control on the transmission by swinging in a forward direction and implements deceleration control on the transmission by swinging in a rearward direction. The grip body is provided on a free end portion of the swing body. The grip part is formed on a first lateral area of the grip body in a transverse direction of the vehicle body and has a convex surface. The vertical lateral surface is formed on a second lateral area of the grip body in the transverse direction of the vehicle body and is a lateral surface of the grip part. The operator-facing surface is formed on the second lateral area of the grip body and extends in the transverse direction of the vehicle body from a bottom edge of the vertical lateral surface. The operation switch groups are arranged on the vertical lateral surface and the operator-facing surface.

According to this configuration, a space defined by the vertical lateral surface and the operator-facing surface is created on one side of the grip part which an operator grips with a palm, and the thumb of the hand gripping or resting on the grip part is in substantially a dangling position. The thumb may move within this space with relative freedom; thus, this space is hereafter referred to as the thumb space. In addition, since the operation switch groups are arranged on the vertical lateral surface and the operator-facing surface, a desired operation switch can be appropriately operated by only slightly moving the thumb within the thumb space. When not operating, the thumb may stand by in a natural (comfortable) position within the thumb space, thereby reducing inconvenience such as carelessly operating an operation switch.

In one aspect of the present invention, a hypothenar rest protruding outward from the grip part is formed on a bottom edge of the grip part. The hypothenar rest prevents the palm resting on the grip part from slipping downward, the grip part having a convex surface. Thus, the operator can comfortably rest the palm on the grip part for an extended period of time.

The most basic operational function of the multifunction operation tool is accelerating the vehicle by the swing operation in the forward direction and decelerating the vehicle in the swing operation in the rearward direction, and such operations are performed by swinging the palm resting on the grip part in the front/back direction (traveling direction of the vehicle). In this instance, the thumb of the hand resting on the grip part is in a relatively free state; thus, the operation switches arranged on the vertical lateral surface and the operator-facing surface can be smoothly operated by the thumb. Therefore, in another aspect of the present invention, the operation switch groups include a travel operation switch group which changes a speed change stage in the transmission and a work operation switch group which controls the work apparatus. At least one travel operation switch that belongs to the travel operation switch group and at least one work operation switch that belongs to the work operation switch group are arranged on the operator-facing surface. In particular, operation switches which are frequently operated at the same time as, or following, the acceleration/deceleration operation of the vehicle are preferably arranged on the vertical lateral surface and the operator-facing surface.

In the multifunction operation tool according to the present invention, when the palm rests on the grip part, the thumb is positioned in the thumb space defined by the vertical lateral surface and the operator-facing surface, and the middle finger and the index finger are positioned on an opposite lateral surface of the grip body with respect to the vertical lateral surface. For this reason, operation switches are preferably arranged on the lateral surface facing the middle finger and the index finger. In another aspect of the present invention, a specific function switch is arranged on at least one of the vertical lateral surface and a lateral surface other than the vertical lateral surface of the grip body. The specific function switch enables a specific function by being operated simultaneously with another manual operation tool including an operation switch that belongs to the operation switch groups. Thus, a joint structure mechanism of the hand, which enables the thumb and the middle finger (or the index finger) to jointly and easily grip an object, can be effectively utilized.

A shuttle switch which switches between forward travel and reverse travel is an operation switch that is frequently operated in conjunction with the acceleration/deceleration operation of the vehicle. Further, because the shuttle switch switches between forward travel and reverse travel, which are significant changes in the state of the vehicle, the operator must operate the shuttle switch with sufficient care. In order to cause the operator to exercise such care, it is preferable that another switch is provided in addition to the shuttle switch, and switching between forward travel and reverse travel is achieved by operating both switches. Moreover, it is desirable that operation of the two switches be performed by a natural movement of the fingers of the hand resting on the grip part so as to enhance operability. To this end, in another aspect of the present invention, the travel operation switch group includes the shuttle switch which switches between forward travel and reverse travel, the shuttle switch is arranged on the operator-facing surface in close proximity to the vertical lateral surface, and a shuttle permission switch which enables/disables a function of the shuttle switch is arranged as the specific function switch on the opposite lateral surface of the grip body with respect to the vertical lateral surface.

The present invention is not only directed to the above-noted multifunction operation tool but is also directed to the armrest operation device provided with the multifunction operation tool. In the armrest operation device according to the present invention provided with the above-noted multifunction operation tool, an integrally configured armrest support base is provided. The armrest support base is divided into a front area, a middle area, and a rear area in the front/back direction of the vehicle body. The multifunction operation tool is arranged in the front area, an armrest base is arranged in the rear area, and an engine control switch group and a work vehicle hydraulic control switch group are arranged in the middle area. In the armrest operation device, burden on the arm is reduced by resting the palm (of the arm resting on the armrest base) on the grip part of the multifunction operation tool, and the multifunction operation tool can be comfortably operated using the palm, thumb, and fingers. In addition, various switch groups are arranged in the middle area between the armrest base and the multifunction operation tool, thereby enabling a concentrated arrangement of the operation switch groups and reducing wiring costs.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Figure 1:
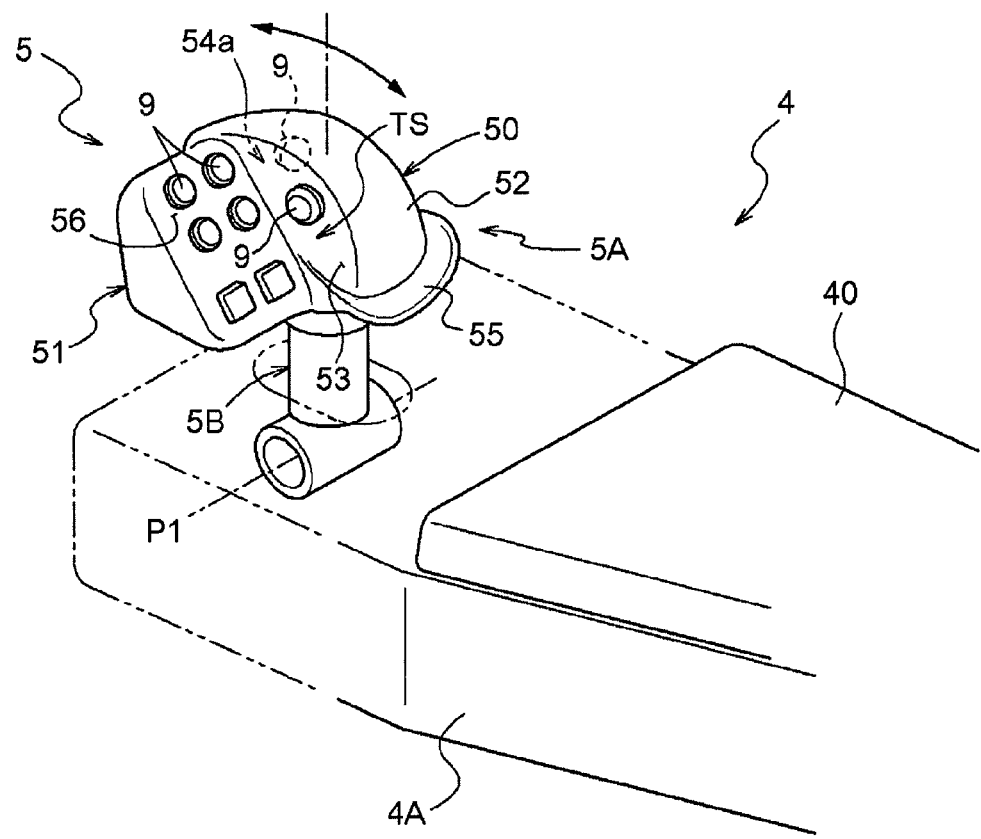
FIG. 1 is a schematic diagram illustrating a basic configuration of the present invention.

Before describing an embodiment of a multifunction operation tool according to the present invention, a basic configuration thereof is described with reference to FIG. 1. FIG. 1 illustrates a multifunction operation tool 5 swingably supported about a swing axis P1, the multifunction operation tool 5 being provided to an armrest support base 4A configuring an armrest operation device 4. The multifunction operation tool 5 is used to control a work vehicle having a work apparatus and a transmission to change traveling speed, such as a tractor and a front loader. The multifunction operation tool 5 substantially includes a grip body 5A and a swing body 5B. In FIG. 1, the swing body 5B is formed as an arm member that swings about the swing axis P1. The present embodiment is configured such that causing the swing body 5B to swing in a first direction from a swing neutral position, in which the swing body 5B is substantially vertical, accelerates the vehicle, and causing the swing body 5B to swing in a second direction decelerates the vehicle.

The grip body 5A is provided on a free end side of the swing body 5B. As illustrated in FIG. 1, the grip body 5A is configured by a grip part 50 that is formed in a right side area, here substantially a right half area, and an extension part 51 (where operation switch groups 9 are arranged) that is formed in a left side area, here substantially a left half area. An outer peripheral surface of the grip body 5A is defined by a convex surface 52, a vertical lateral surface 53, a back surface 54a (see FIG. 7), and a bottom surface 54b (see FIG. 7). The convex surface 52 is shaped so that a palm gripping the grip part 50 easily covers the convex surface 52. The vertical lateral surface 53 is a surface which extends substantially perpendicularly with respect to a left edge of the convex surface 52. A tongue piece protruding outward is formed as a hypothenar rest 55 on a bottom edge of the grip part 50, that is, on at least a portion of a boundary area between the bottom surface 54b and the convex surface 52. The hypothenar rest 55 is shaped to hold the hypothenar of a hand resting on the grip part 50 so that the palm does not slip downward.

A top surface of the extension part 51 has a surface that is substantially flat or very slightly convex. Because in actual application the top surface of the extension part 51 is arranged so as to face an operator, the extension part 51 is hereafter also referred to as an operator-facing surface 56. The operator-facing surface 56 has a shape that extends in a left direction from a bottom edge of the vertical lateral surface 53 of the grip part 50, with the grip part 50 and the extension part 51 connected and the operator-facing surface 56 and the vertical lateral surface 53 intersecting substantially perpendicular to each other. Thus, a space defined by the operator-facing surface 56 and the vertical lateral surface 53 is large enough that the thumb of the hand resting on the grip part 50 can move freely to a certain extent. For this reason, this space is referred to as a thumb space TS.

At least one operation switch (including buttons and levers and the like) that belongs to the operation switch groups 9 is arranged on the vertical lateral surface 53 and the operator-facing surface 56. The operation switch groups 9 include a travel operation switch group which changes a speed change stage in the transmission and a work operation switch group which controls the work apparatus. In the example of FIG. 1, travel operation switches that belong to the travel operation switch group and work operation switches that belong to the work operation switch group are arranged in an intermingled manner on the operator-facing surface 56. Operation switches that belong to the travel operation switch group are arranged on the vertical lateral surface 53, and these operation switches are basically arranged so as to be easily operated with the thumb of the hand resting on the grip part 50. Operation switches that belong to the travel operation switch group are also arranged on the back surface 54a of the grip part 50 so as to be easily operated with the middle finger or the index finger of the hand resting on the grip part 50.

The armrest operation device 4 includes the armrest support base 4A which serves as a mounting base. The armrest support base 4A is divided into a front area, a middle area, and a rear area. The multifunction operation tool 5 is provided in the front area, and the armrest base 40 on which the operator rests an arm is provided in the rear area. An engine control switch group, a work vehicle hydraulic control switch group, and the like are arranged in the front area (other than the installation position of the multifunction operation tool 5) and the middle area. The armrest operation device 4 is integrally mounted in an area from a side of an operator's seat of the work vehicle to a front side thereof.

Figure 2:
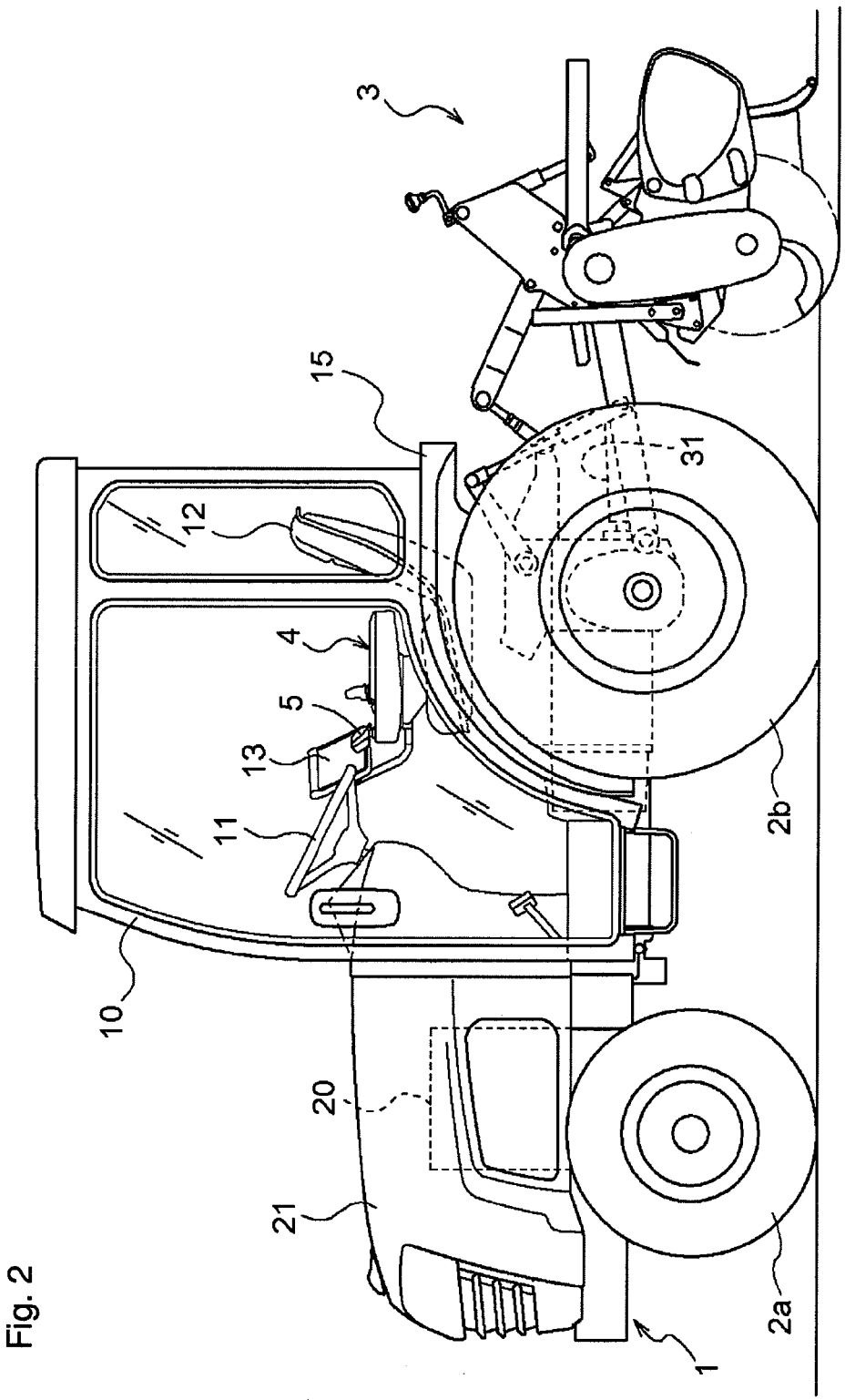
FIG. 2 is a side view of a tractor that is an example of a work vehicle provided with an embodiment of an armrest operation device having a multifunction operation tool according to the present invention.

Next, a specific embodiment of the armrest operation device having the multifunction operation tool according to the present invention is described. FIG. 2 is a side view of a tractor that is an example of the work vehicle provided with such an armrest operation device. As illustrated in FIG. 2, in the tractor, an engine 20 is mounted on a front portion of a vehicle body 1 of the tractor and a transmission is mounted rearward of the engine 20, the vehicle body 1 being supported by front wheels 2a and rear wheels 2b. Rearward of the vehicle body 1, a rotary tilling apparatus as a work apparatus 3 is provided so as to be vertically movable via a link mechanism 30. The tractor is a four-wheel-drive vehicle in which the power of the engine 20 is transmitted to the front wheels 2a and the rear wheels 2b via a transmission mechanism for traveling built into the transmission. Further, the power of the engine 20 is also transmitted to the work apparatus 3 via a PTO shaft 31 that protrudes rearward from the transmission.

The engine 20 is covered by a hood 21. A cabin 10 is supported by the vehicle body 1 rearward of the hood 21 and above the transmission.

An interior of the cabin 10 acts as a driving space. A steering handle 11 is provided in a front portion of the driving space to steer the front wheels 2a and an operator's seat 12 is provided in a rear portion of the driving space between a left/right pair of rear wheel fenders 15. The armrest operation device 4 having the multifunction operation tool 5 is provided from one side of the operator's seat 12 toward the front thereof. A display 13 which visually notifies an operator of various information is provided on a front side of the armrest operation device 4.

Figure 3:
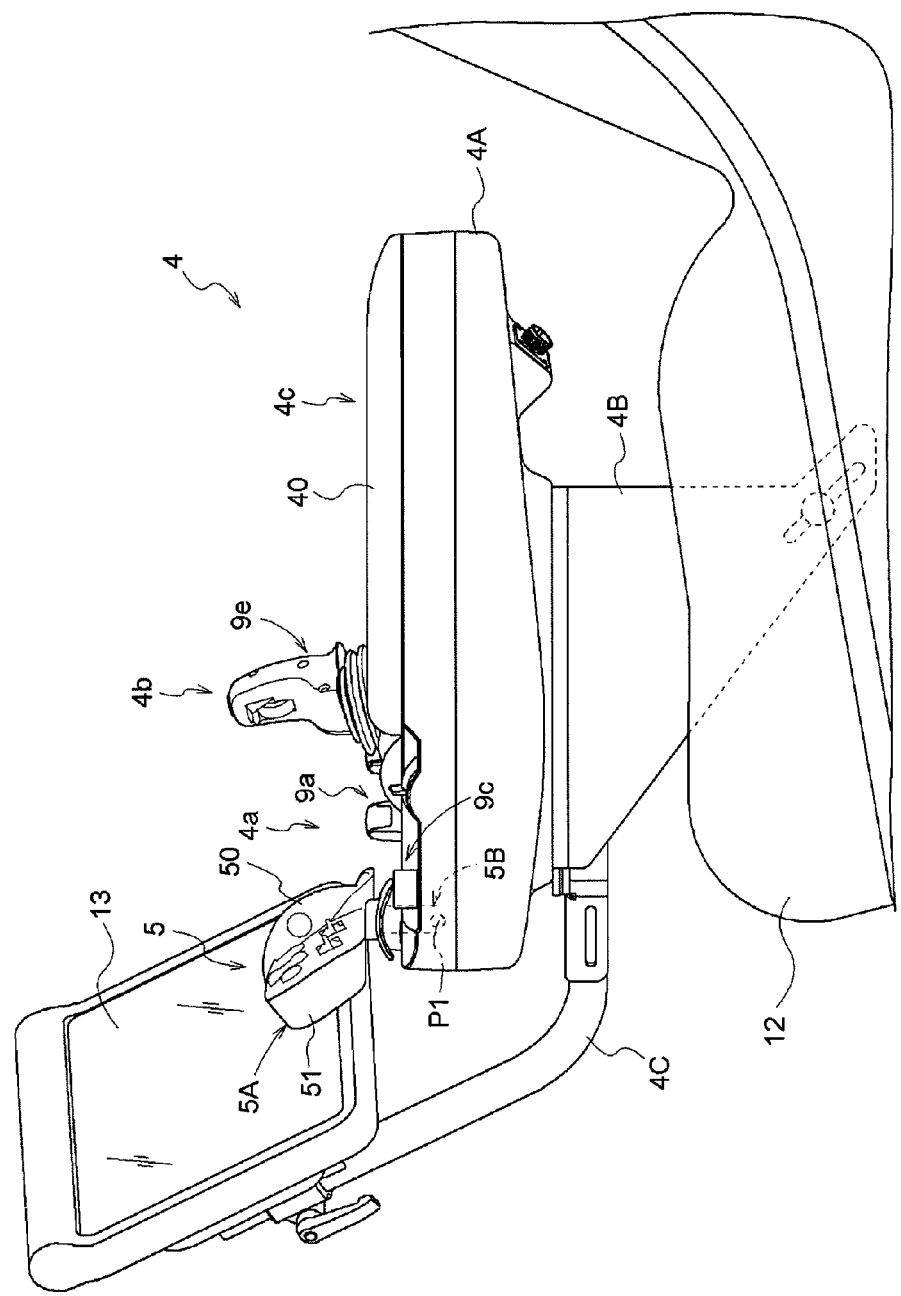
FIG. 3 is a side view of the armrest operation device provided to the tractor.

As shown in FIG. 3, the armrest operation device 4 includes the armrest support base 4A which is fixed to a mounting bracket 4B, the mounting bracket 4B being fixed to a support frame not shown in the drawings. A support rod or member 4C, which inclines upward while extending forward, is fixed to the mounting bracket 4B, and the display 13 (such as a liquid crystal panel and the like) is mounted on a forefront end of the support rod 4C. The display 13 allows an input operation to be performed via a touch panel and can accept various operation inputs by the operator.

Figure 4:
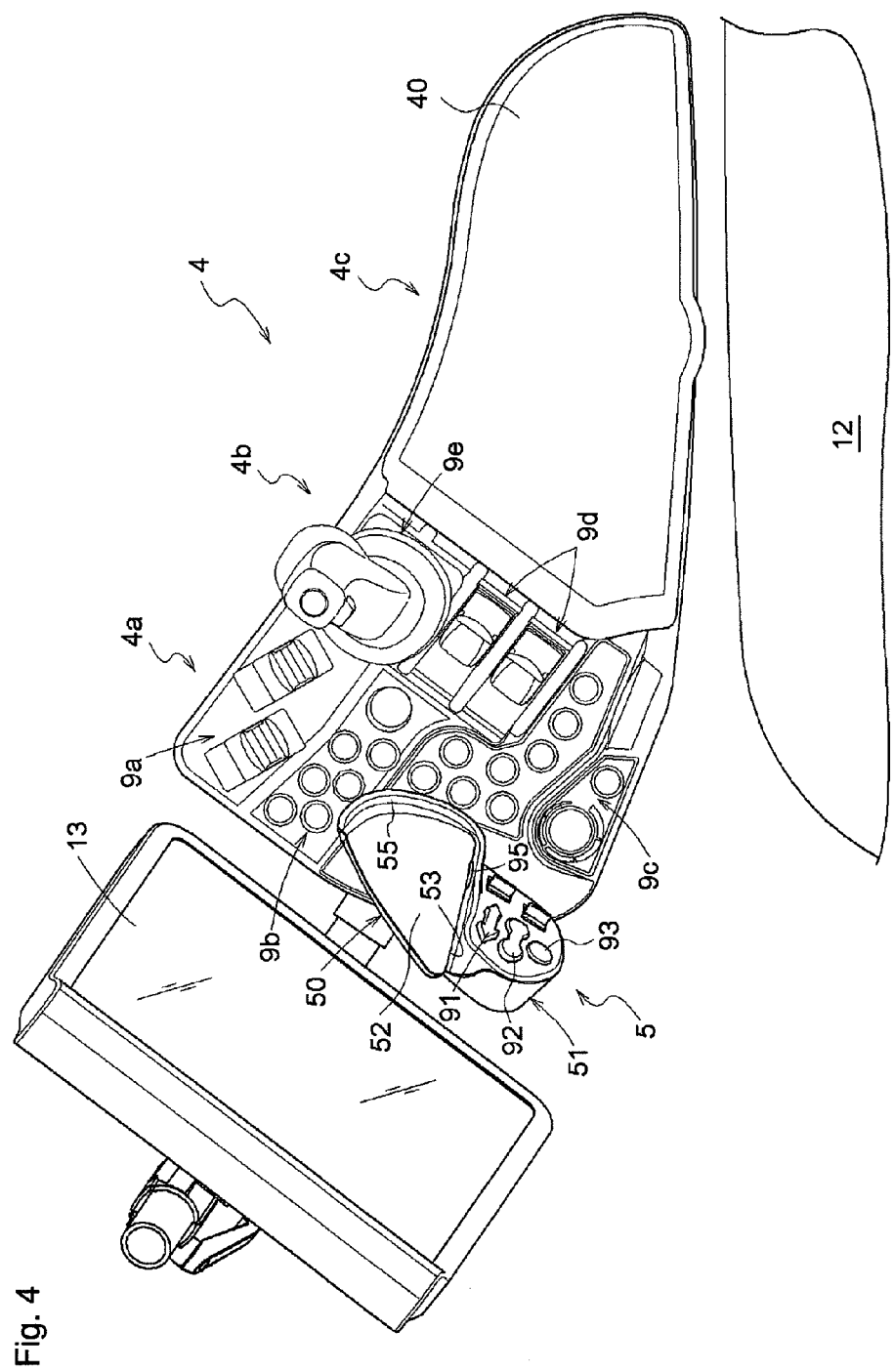
FIG. 4 is a top or plan view of the armrest operation device.

As is clear from FIG. 4, the armrest operation device 4 can be divided into a front area 4a, a middle area 4b, and a rear area 4c in a plan view. The cushioned armrest base 40 on which an operator's arm rests is provided in the rear area 4c. The multifunction operation tool 5 (described in detail below) is provided in substantially a left half of the front area 4a. In substantially a right half of the front area 4a, a first operation switch group 9a and a second operation switch group 9b are arranged as the operation switch groups 9. In the middle area 4b, starting from a left side thereof, a third operation switch group 9c, a fourth operation switch group 9d, and a fifth operation switch group 9e are arranged as the operation switch groups 9. In each of the operation switch groups 9, operation switches having various forms such as a button, a switch, a dial, a lever, and a joystick are provided.

Figure 5:
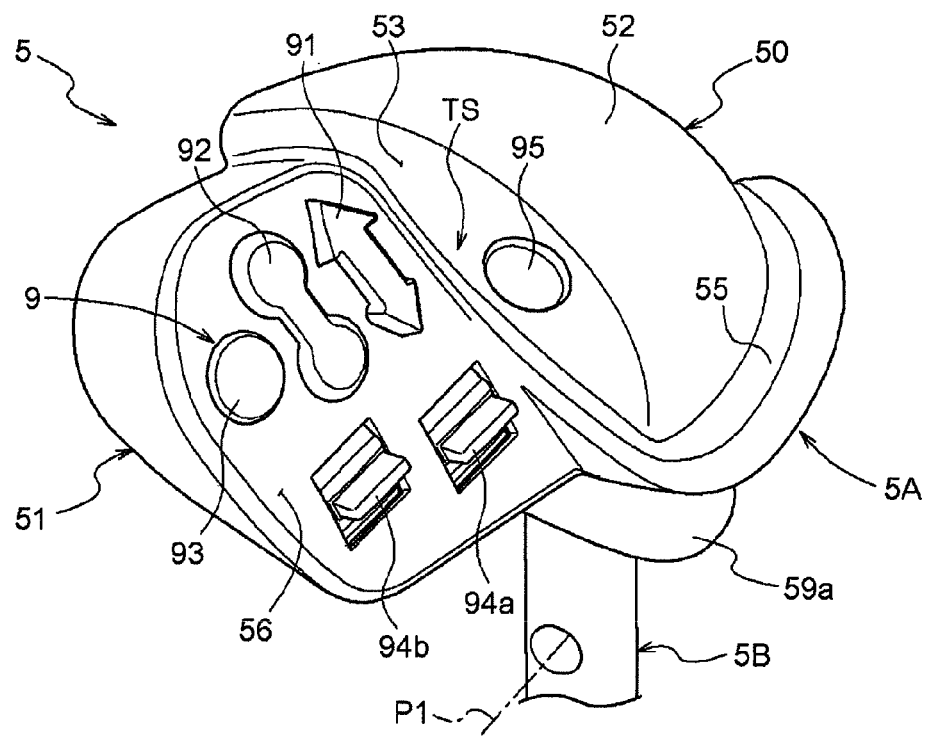
FIG. 5 is a perspective view from above of the multifunction operation tool provided to the armrest operation device.
Figure 6:
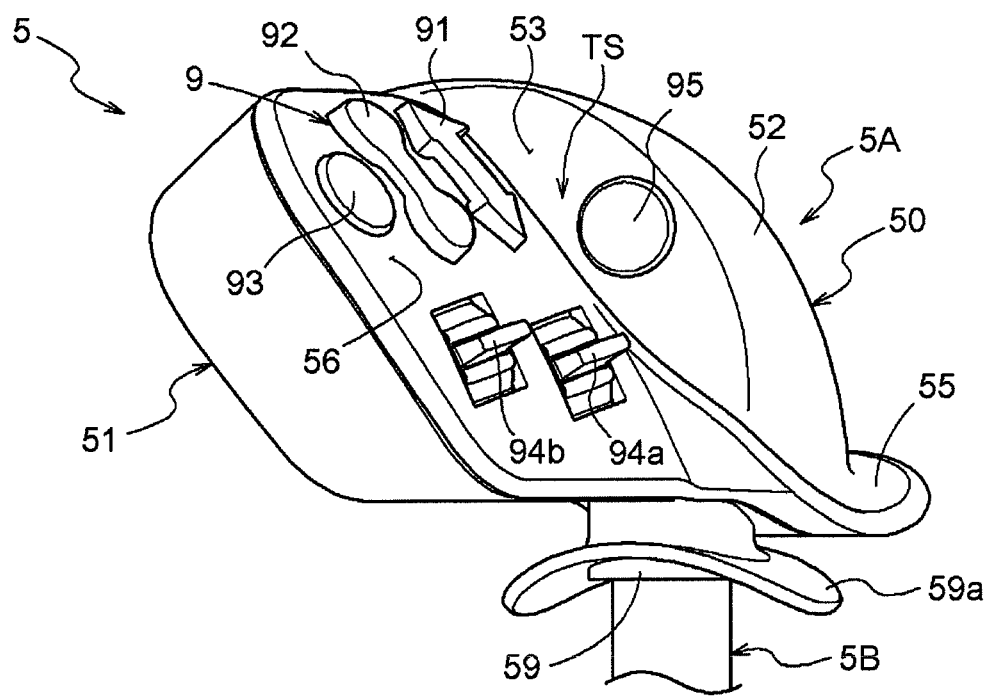
FIG. 6 is a side perspective view of the multifunction operation tool.
Figure 7:
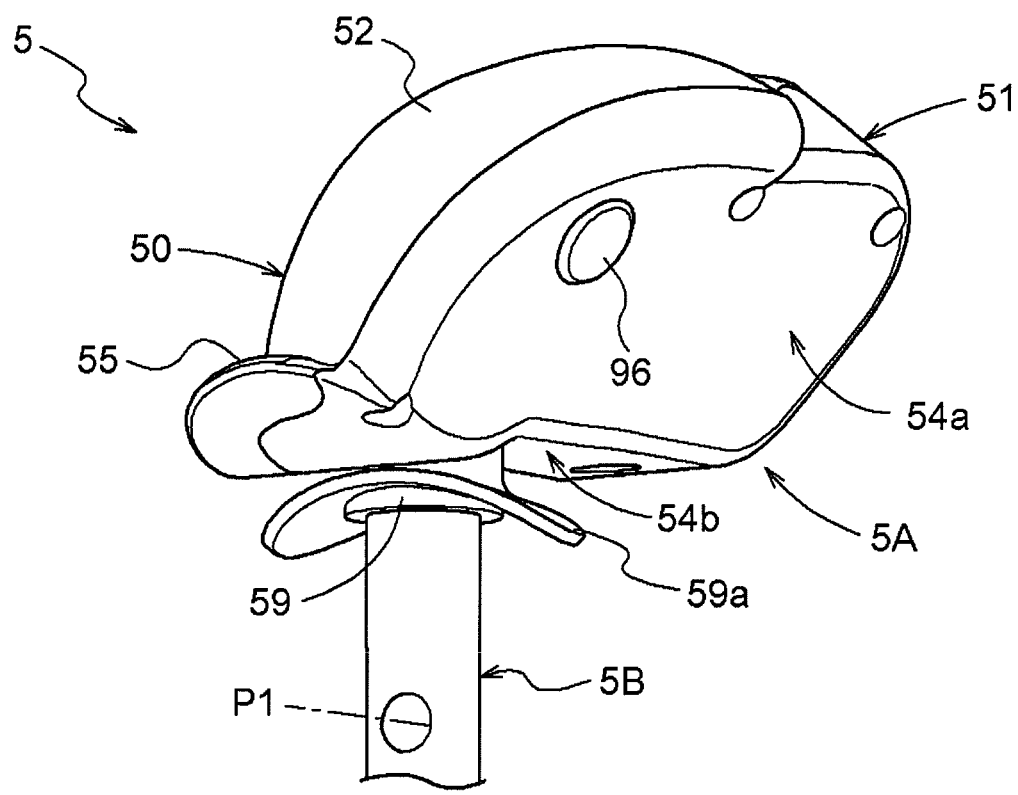
FIG. 7 is a rear perspective view of the multifunction operation tool.
Figure 8:
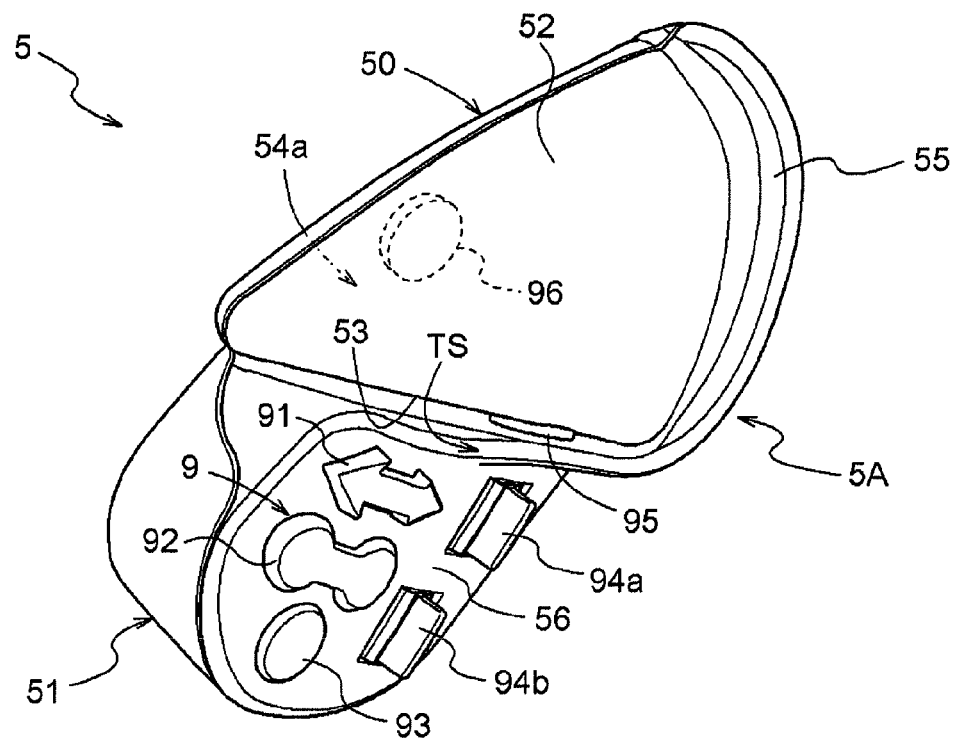
FIG. 8 is a perspective view from above of the multifunction operation tool.

FIGS. 5 through 8 illustrate the multifunction operation tool 5 viewed from various directions. The multifunction operation tool 5 is intended for right-hand operation. As schematically shown in FIGS. 6 and 7, the grip body 5A of the multifunction operation tool 5 is mounted to the swing body 5B that swings about the swing axis P1, the swing axis P1 extending in substantially a transverse direction of the vehicle body 1. In this instance, the swing body 5B is fitted into a bush part 59 formed on the bottom surface 54b of the grip body 5A. A skirt 59a is formed around a periphery of a bottom end of the bush part 59. The skirt 59a serves as a guide member to a swing port formed on the armrest support base 4A and also as a dust-preventing member.

The grip body 5A is configured by the grip part 50 and the extension part 51 extending from the left side of the grip part 50. The grip part 50 and the extension part 51 are integrally formed. A configuration in which the grip part 50 and the extension part 51 are formed separately and then joined together is also possible. The grip part 50 in a plan view (see FIG. 8) has a slightly modified ⅛ circle shape, with the top surface of the grip part 50 being the convex surface 52 and the bottom surface 54b being substantially flat. In addition, the back surface 54a is a substantially flat surface shared with the extension part 51 (see FIG. 7). The convex surface 52 has a curved shape to accommodate a depression created by a palm when the fingers are bent slightly inward. When the grip part 50 is held between the palm resting on the convex surface 52 and the fingers pressed against the back surface 54a, the hand becomes stable, and the thumb, which is positioned on the left side of the grip part 50, can move freely.

The left lateral surface of the grip part 50 is formed into the substantially flat vertical lateral surface 53. The thumb space TS which allows free movement of the thumb is created between the vertical lateral surface 53 and the substantially flat operator-facing surface 56, the operator-facing surface 56 being formed on the top surface of the extension part 51. An angle between the vertical lateral surface 53 and the operator-facing surface 56 is approximately 110 degrees. In addition, a twist angle of the operator-facing surface 56 with respect to the grip part 50 is defined such that the operator-facing surface 56 faces a line of vision of the operator sitting in the operator's seat 12.

The hypothenar rest 55 protruding in a tongue piece shape is formed from the right bottom edge of the grip part 50 to a boundary edge between the vertical lateral surface 53 and the operator-facing surface 56. The protrusion width of the hypothenar rest 55 is wide enough to substantially rest a little finger.

The transmission has six auxiliary speed change units and four main speed change units, and the main speed change units are speed change units in which impact generated by switching speed change stages is inhibited by appropriate hydraulic control. Twenty-four stages of speed changes are achieved by combining the speed change stages of the auxiliary speed change units and the main speed change units. This switching of speed change stages, that is, upshift and downshift, is executed by the grip part 50 swinging about the swing axis P1, and ultimately by swinging of the swing body 5B. That is, upshift is executed by displacing the grip part 50 forward while resting the palm on the grip part 50 and downshift is executed by displacing the grip part 50 rearward while resting the palm on the grip part 50.

As illustrated in FIG. 5, in the present embodiment, a shuttle button 91 and a speed change ratio fixing button 93 that belong to a travel-related operation switch group 9, and an up/down button 92 and two hydraulic control switches 94a and 94b that belong to a work-related operation switch group 9, are provided on the operator-facing surface 56. The shuttle button 91 is arranged on substantially an upper half (back half) of the operator-facing surface 56, in a position closest to the vertical lateral surface 53. The up/down button 92 is arranged next to the shuttle button 91 on a left side and the speed change ratio fixing button 93 is arranged further left of the shuttle button 91. The hydraulic control switches 94a and 94b are arranged side by side on substantially a lower half (back half) of the operator-facing surface 56. In addition, a speed change auxiliary button 95 is arranged on the vertical lateral surface 53. Further, as illustrated in FIG. 7, a shuttle auxiliary button 96 is arranged on the back surface 54a of the grip part 50. The shuttle auxiliary button 96 can be easily operated with the index finger or the middle finger of the hand whose palm is resting on the convex surface 52 of the grip part 50.

The shuttle button 91 switches the transmission to forward travel when an upward arrow portion of the shuttle button 91 is pressed along with the shuttle auxiliary button 96, and switches the transmission to reverse travel when a downward arrow portion of the shuttle button 91 is pressed along with the shuttle auxiliary button 96. That is, forward travel and reverse travel of the tractor can be selected by pressing the shuttle button 91 with the thumb while pressing the shuttle auxiliary button 96 with the middle finger or the index finger (a ring finger or the little finger is also possible).

As described above, the transmission adopted in the present embodiment has main speed change units, in which impact generated by switching speed change stages is inhibited by appropriate hydraulic control, and ordinary synchromesh-type auxiliary speed change units. Therefore, it is preferable that a speed change stage changing operation involving four speed change stages of only the main speed change units without involving the auxiliary speed change units, and a speed change stage changing operation involving the auxiliary speed change units, are each implemented with the difference therebetween in mind. To this end, when switching speed change stages (upshifting/downshifting) via the swinging operation of the grip part 50 about the swing axis P1, the speed change stage changing operation involving only the main speed change units without involving the auxiliary speed change units is enabled even without pressing the speed change auxiliary button 95; however, the speed change stage changing operation involving the auxiliary speed change units is disabled when the speed change auxiliary button 95 is not pressed. The speed change stage changing operation involving the auxiliary speed change units must be implemented while pressing the speed change auxiliary button 95. In this instance, the grip part 50 is displaced forward or rearward by the palm while pressing the speed change auxiliary button 95 with the thumb.

In addition, an appropriate speed change ratio according to a vehicle speed can be set by a transmission controller that controls the transmission. However, there are cases during performance of work and the like in which it is preferable to maintain the speed change ratio even when the vehicle speed temporarily changes. In order to overcome this issue, the speed change ratio fixing button 93 is configured as a button that forcibly fixates the speed change ratio and can issue a command to the transmission controller to maintain the speed change ratio of the transmission even when the vehicle speed decreases due to brake operation and the like.

The up/down button 92 is divided into an upper button and a lower button. Pressing the upper button of the up/down button 92 causes the work apparatus 3 to be lifted and pressing the lower button of the up/down button 92 causes the work apparatus 3 to be lowered. The hydraulic control switches 94a and 94b control valves of hydraulic piping connected to the work apparatus 3.

Other Embodiments (1) In the above-noted embodiments, a multiple gear transmission mechanism is mounted to the vehicle as the transmission, and speed change stages are switched in stages by the swinging operation of the grip part 50 about the swing axis P1. In contrast, in a case where a continuously variable transmission mechanism is adopted as the transmission, the embodiment can be configured so that a continuous variable speed change is implemented by the swinging operation of the grip part 50 about the swing axis P1. That is, when the grip part 50 swings forward from the neutral position about the swing axis P1, continuous acceleration is implemented, and when the grip part 50 swings rearward from the neutral position about the swing axis P1, continuous deceleration is implemented.

(2) The types and arrangements of the operation switch groups 9 arranged on the grip body 5A as presented in the above-noted embodiments are only exemplary, and operation switches selected from the operation switch groups 9 can be freely arranged as necessary.

(3) The shapes of the grip part 50 and the extension part 51 are also not limited to the shapes shown in the drawings. The top surface shape of the grip part 50 can be any shape as long as at least an outer contour thereof is convex to accommodate the palm in a natural manner. The shape of the extension part 51 can be any shape as long as the thumb space TS can be created between the extension part 51 and the grip part 50 and a plurality of operation switches can be arranged so as to be operable by the thumb of the hand resting on the grip part 50. Further, the surface of the extension part 51 may be a rough surface or a glossy surface.

(4) In the above-noted embodiments, the grip body 5A and the swing body 5B swing and are displaced about the swing axis P1 only; however, the grip body 5A and the swing body 5B may be displaced about another axis or be displaceable in all directions using a spherical joint, such as in a joystick.

In addition to tractors, the present invention can also be applied to various work vehicles including agricultural vehicles such as combines and rice transplanters, and construction vehicles such as front loaders and backhoes.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A multifunction operation tool controlling a work vehicle with speed changing capability, the multifunction operation tool comprising:
   a swing body swingably supported at least in a front/back direction of a vehicle body for implementing acceleration control and deceleration control;
   a grip body arranged on a free end portion of the swing body;
   a grip part arranged on the grip body and being defined by a convex surface arranged on a first lateral area of the grip body and a vertical lateral surface;
   a second lateral area arranged on the grip body and being located on an opposite lateral side of the vertical lateral surface of the grip part;
   an operator-facing surface arranged on the second lateral area of the grip body and extending to the vertical lateral surface; and
   operation switches,
   wherein at least one operation switch is arranged on the vertical lateral surface and two or more operation switches are arranged on the operator-facing surface.

2. The multifunction operation tool according to claim 1, wherein the work vehicle comprises a work apparatus and a transmission.

3. The multifunction operation tool according to claim 1, wherein forward swinging movement of the swing body is utilized in acceleration control and rearward swinging movement of the swing body is utilized in deceleration control.

4. The multifunction operation tool according to claim 1, wherein the operation switches comprises groups of operation switches.

5. The multifunction operation tool according to claim 1, wherein the grip part comprises an outwardly protracting hypothenar rest arranged on a bottom portion of the grip part.

6. The multifunction operation tool of claim 5, wherein the operation switches comprise at least one of:
   a travel operation switch group coupled to or providing control to a transmission;
   a work operation switch group coupled to or providing control of a work apparatus; and
   at least one travel operation switch and at least one work operation switch arranged on the operator-facing surface.

7. The multifunction operation tool according to claim 6, wherein at least one of:
   the at least one operation switch is arranged on the vertical lateral surface is a specific function switch; and/or
   a specific function switch is arranged on another lateral surface of the grip body,
   wherein the specific function switch is configured to enable a specific function when operated simultaneously with another operation switch.

8. An armrest operation device comprising:
   the multifunction operation tool according to claim 5; and
   an armrest support base having a front area, a middle area, and a rear area oriented in a front/back direction of the vehicle body,
   wherein the multifunction operation tool is arranged in the front area and the middle area includes an engine control switch group and a work vehicle hydraulic control switch group.

9. The multifunction operation tool of claim 1, wherein the operation switches comprise at least one of:
   a travel operation switch group coupled to or providing control to a transmission;
   a work operation switch group coupled to or providing control of a work apparatus; and
   at least one travel operation switch and at least one work operation switch arranged on the operator-facing surface.

10. The multifunction operation tool according to claim 9, wherein at least one of:
    the at least one operation switch is arranged on the vertical lateral surface is a specific function switch; and/or
    a specific function switch is arranged on another lateral surface of the grip body,
    wherein the specific function switch is configured to enable a specific function when operated simultaneously with another operation switch.

11. The multifunction operation tool according to claim 1, wherein at least one of:
    the at least one operation switch is arranged on the vertical lateral surface is a specific function switch; and/or
    a specific function switch is arranged on another lateral surface of the grip body,
    wherein the specific function switch is configured to enable a specific function when operated simultaneously with another operation switch.

12. An armrest operation device comprising:
    the multifunction operation tool according to claim 11; and
    an armrest support base having a front area, a middle area, and a rear area oriented in a front/back direction of the vehicle body, wherein the multifunction operation tool is arranged in the front area and the middle area includes an engine control switch group and a work vehicle hydraulic control switch group.

13. The multifunction operation tool according to claim 1, wherein the operation switches comprise a travel operation switch group that includes:
   a shuttle switch which switches between forward travel and reverse travel, said shuttle switch being arranged on the operator-facing surface adjacent to the vertical lateral surface; and
   a shuttle permission switch which enables/disables a function of the shuttle switch and is arranged on an opposite lateral surface of the grip body with respect to the vertical lateral surface.

14. The multifunction operation tool according to claim 13, wherein the shuttle permission switch is a specific function switch.

15. An armrest operation device comprising:
   the multifunction operation tool according to claim 1; and
   an armrest support base having a front area, a middle area, and a rear area oriented in a front/back direction of the vehicle body,
   wherein the multifunction operation tool is arranged in the front area and the middle area includes an engine control switch group and a work vehicle hydraulic control switch group.

16. A multifunction operation tool controlling a work vehicle with speed changing capability, the multifunction operation tool comprising:
   a swing body portion swingably supported at least in a front/back direction of a vehicle body for implementing acceleration control and deceleration control;
   a grip body arranged on an upper end of the swing body portion;
   said grip body comprising:
      a convex grip surface;
      a vertical lateral surface; and
      an operator-facing surface extending to the vertical lateral surface; and
   operation switches,
   wherein at least one operation switch is arranged on the vertical lateral surface and two or more operation switches are arranged on the operator-facing surface.

17. A multifunction operation tool controlling a work vehicle with speed changing capability, the multifunction operation tool comprising:
   a swing body portion swingably supported at least in a front/back direction of a vehicle body for implementing acceleration control and deceleration control;
   a grip body arranged on an upper end of the swing body portion;
   said grip body comprising:
      an upward facing convex grip surface;
      a vertical lateral surface; and
      an operator-facing surface extending to the vertical lateral surface and being angled with respect to an imaginary horizontal surface; and
   operation switches,
   wherein at least one operation switch is arranged on the vertical lateral surface and two or more operation switches are arranged on the operator-facing surface.

* * * * *